(12) United States Patent
Pepin et al.

(10) Patent No.: US 7,634,578 B2
(45) Date of Patent: Dec. 15, 2009

(54) NODE-TO-NODE COMMUNICATION PIPELINES

(75) Inventors: Brian K. Pepin, Seattle, WA (US);
James S. Miller, Bellevue, WA (US);
Jeffrey Richter, Kirkland, WA (US);
Thomas E. Quinn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 11/181,614

(22) Filed: Jul. 14, 2005

(65) Prior Publication Data

US 2007/0016691 A1    Jan. 18, 2007

(51) Int. Cl.
*G06F 15/16* (2006.01)
*G06F 9/455* (2006.01)
*G06F 9/44* (2006.01)

(52) U.S. Cl. .................... 709/246; 703/27; 717/122; 717/170

(58) Field of Classification Search .................. 709/246
See application file for complete search history.

(56) References Cited

U.S. PATENT DOCUMENTS

2004/0034860 A1 *   2/2004   Fernando et al. ............ 719/315

OTHER PUBLICATIONS

International Search Report PCT/US 06/22230. Mailed Mar. 24, 2008. 1 Page.

* cited by examiner

*Primary Examiner*—Ario Etienne
*Assistant Examiner*—Blake Rubin
(74) *Attorney, Agent, or Firm*—Workman Nydegger

(57) ABSTRACT

Node-to-node communication pipelines may include code modules that are configured and assembled across a protocol according to dynamically input module-specific parameters. The parameters may be input to a service into which the modules are registered, and one or more appropriate pipelines may be dynamically assembled.

16 Claims, 4 Drawing Sheets

NODE-TO-NODE COMMUNICATION PIPELINES

BACKGROUND

Applications, programs, functions, and other assemblage of programmable and executable code may be modularized. That is, code associated with the aforementioned assemblies may be divided into code modules that may be independently generated and regenerated (i.e., new versions generated) by different parties and at different times. Examples of such code modules include "add-ins", which may be added into an application at runtime by an end user.

At runtime, such code modules may become interrelated or such an interrelationship may be otherwise revealed. However, runtime may also reveal versioning and/or compatibility issues exist among the code modules. "Versioning" issues may refer to changes made to one or more portions of the aforementioned generated and add-in applications, programs, functions, and other assemblages of programmable and executable code; and compatibility issues may arise due to even subtle changes in any portion thereof.

SUMMARY

Dynamic node-to-node communication pipelines are described herein.

More particularly, the example implementations described herein relate to node-to-node communication pipelines that include code modules that may be configured and assembled according to dynamically input module-specific parameters. The parameters may be input to a service into which the modules are registered, and one or more appropriate pipelines may be dynamically assembled.

DESCRIPTION OF THE DRAWINGS

Dynamic node-to-node communication pipelines are presently described in accordance with the following figures.

DETAILED DESCRIPTION

Dynamic peer-to-peer communication pipelines are described herein.

More particularly, dynamic node-to-node communication pipelines, as described herein, may relate to fixed stage, node-to-node pipelines that may be assembled in variably specified orders. Further, dynamic node-to-node communication pipelines may be implemented in one or more devices, or nodes, in a network environment, whereby the node configuration may include a peer-to-peer configuration or a host-to-client configuration.

"Pipelines", as described herein, may include at least one or more node application programming interfaces (hereafter "API"), one or more adapters, and at least one protocol. Such pipelines may include the aforementioned APIs, adapters, and protocols in varying quantities and combinations, and need not necessarily include all of the aforementioned pipeline elements.

"API", as described herein, may refer to a set of routines used by an application, program, function, and other assemblage of programmable and executable code to direct the performance of procedures therefore by a corresponding execution environment, such as an operating system or runtime execution environment. "Adapters", as described herein, may refer to modules or objects that are capable of communicatively adapting one API to another API, and may be linked serially or via a protocol. "Protocol", as described herein, may refer to a specification or contract through which objects, of which an API is a non-exclusive example, may communicate.

Therefore, as described herein, a "pipeline" may further refer to a chain of code modules or objects that flow from a host API adapter to an add-in API adapter, via a protocol, to thereby connect a first node application (e.g., a host application) to a second node application (e.g., an add-in application).

Figure 1:
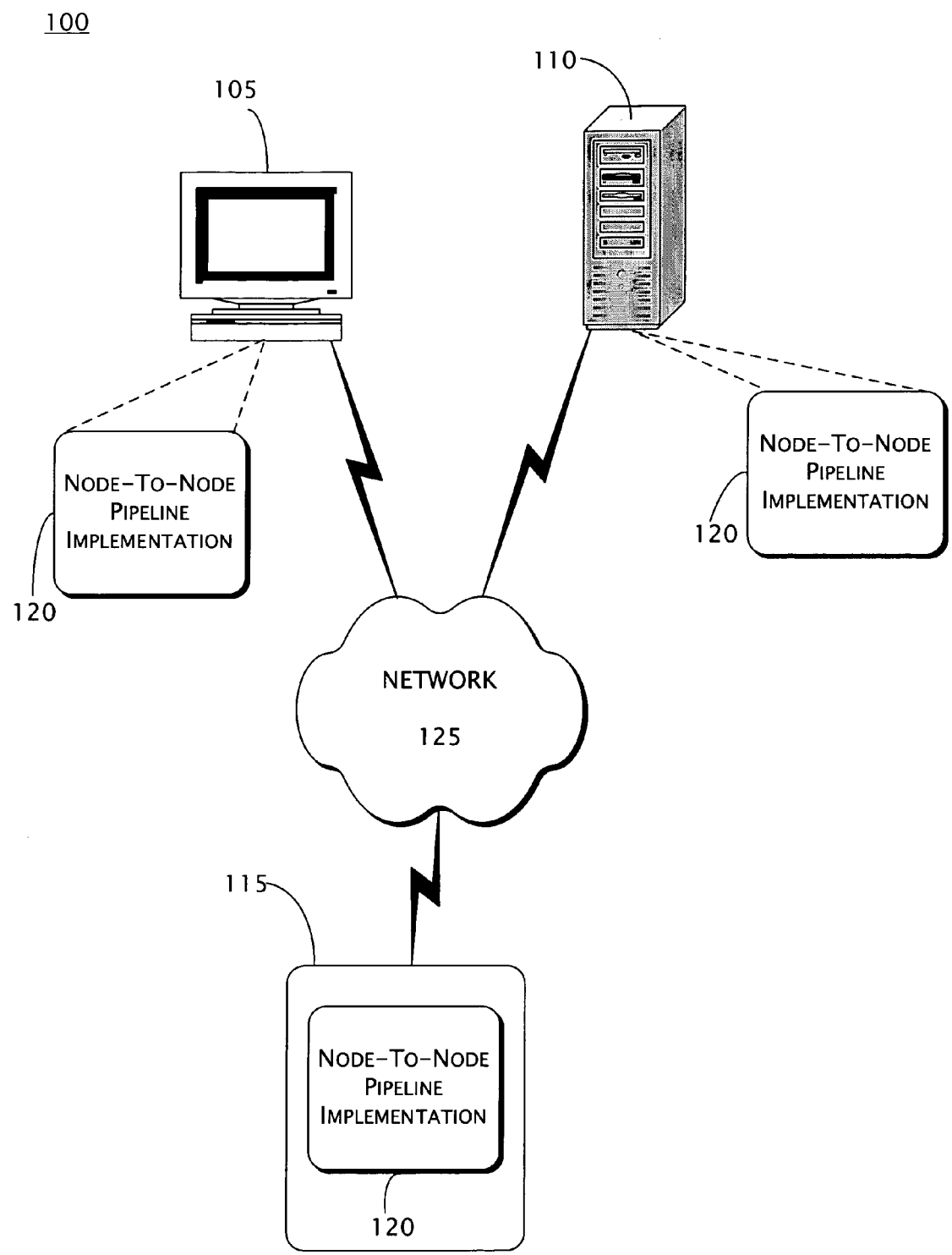
FIG. 1 shows devices communicating over a network, with the devices implementing example technologies for module initialization.

FIG. 1 shows example network environment 100 in which example technologies for dynamic node-to-node communication pipelines may be implemented, although dynamic node-to-node communication pipelines are not limited to network environments. In FIG. 1, client device 105, server device 110, and "other" device 115 may be communicatively coupled to one another via network 125; and, further, at least one of client device 105, server device 110, and "other" device 115 may be capable of implementing dynamic peer-to-peer communication pipelines 120, as described herein.

Client device 105 may represent at least one of a variety of conventional computing devices, including a desktop personal computer (PC), workstation, mainframe computer, Internet appliance, set-top box, and gaming console. Client device 105 may further represent at least one of any device that is capable of being associated with network 125 by a wired and/or wireless link, including a mobile (i.e., cellular) telephone, personal digital assistant (PDA), laptop computer, etc. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation of dynamic node-to-node communication pipelines 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may represent any further device that is capable of implementing dynamic node-to-node communication pipelines 120 according to one or more of the examples described herein. That is, "other" device 115 may represent any software-enabled computing or processing device that is capable of implementing module initialization for an application, program, function, or other assemblage of programmable and executable code in at least a managed execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as 802.11 system or, on a larger scale, a wide area network (i.e., WAN"); or a personal area network (i.e., PAN), such as Bluetooth.

Computer architecture in at least one of devices 105, 110, and 115 has typically been defined computing platforms in terms of hardware and software. Software for computing devices has been categorized into groups, based on function, which may include: a hardware abstraction layer (alternatively referred to as a "HAL"), an operating system (alternatively referred to as "OS"), and applications.

A runtime execution environment may refer to an isolated space, between an OS and an application, in which the application may execute specific tasks on at least one of processing device 105, 110, or 115. More particularly, a runtime execution environment may enhance the reliability of the execution of applications on a growing range of processing devices 105, 110, and 105, including servers, desktop computers, laptop computers, and mobile processing devices by providing a layer of abstraction and services for an application running on such processing devices, and further providing the application with capabilities including memory management and configuration thereof.

A runtime execution environment may serve as at least one of an application programming and application execution platform. As an application programming platform, a runtime execution environment may compile targeted applications, which may be written in one of multiple computing languages, into an intermediate language (hereafter "IL"). IL is typically independent of the platform and the central processing unit (hereafter "CPU") executes IL. In fact, IL is a higher level language than many CPU machine languages. As an application execution platform, a runtime execution environment may interpret compiled IL into native machine instructions. A runtime execution environment may utilize either an interpreter or a compiler (e.g., "just-in-time", alternatively "JIT", compiler) to execute such instructions. Regardless, the native machine instructions may then be directly executed by the CPU. Since IL is CPU-independent, IL may execute on any CPU platform as long as the OS running on that CPU platform hosts an appropriate runtime execution environment. Examples of runtime environments, to which implementation of dynamic node-to-node communication pipelines 120 may pertain, include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, this listing of runtime environments provides examples only. The example implementations are not limited to just these managed execution environments. More particularly, the example implementations are not just limited to managed execution environments, for one or more examples may be implemented within testing environments and/or unmanaged execution environments.

An application compiled into IL may be referred to as "managed code", and that is why a runtime execution environment may be alternatively referred to as a "managed execution environment". It is noted that code that does not utilize a runtime execution environment to execute may be referred to as native code applications.

In at least one managed execution environment, a unit of isolation or "isolation construct" for a process may be referred to as an application domain. Such terminology is provided as an example only. That is, the example implementations described herein are not limited to application domains or even to managed execution environments as stated above, but rather may be applied within various other isolation construct implementations in various execution environments.

Isolation constructs (e.g., application domains) may enable the code to be executed therein to be loaded from a specified source; an isolation construct may be aborted independent of other such isolation constructs; and processing within an isolation construct may be isolated so that a fault occurring therein does not affect other isolation constructs within the process. In other words, the effects of processing within an isolation construct are not visible to concurrently-running constructs until the overall process is made permanent. For the sake of consistency, the discussion hereafter may refer to "applications" and "processes", both of which may encompass any one of, at least, software programs, and applications, either singularly or in combination.

Figure 2:
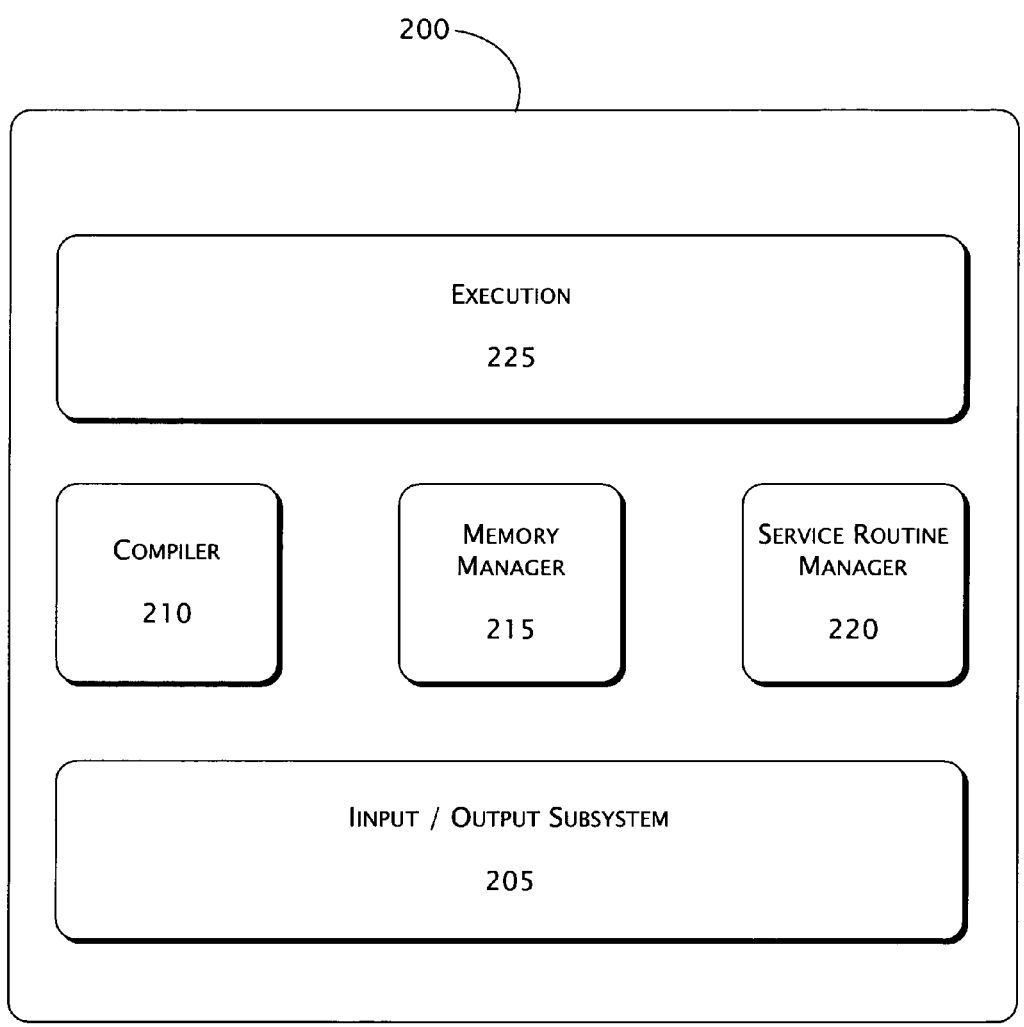
FIG. 2 shows an example of an execution environment for implementing example technologies for implementing dynamic node-to-node communication pipelines.

FIG. 2 shows an example of runtime execution environment 200 in which examples of dynamic node-to-node communication pipelines 120 (see FIG. 1), particularly inter-protocol dynamic node-to-node communication pipelines, may be implemented.

According to at least one example implementation, runtime execution environment 200 may facilitate execution of managed code for a computing device platform. Managed code may be considered to be part of a core set of application-development technologies, and may further be regarded as an application, program, function, or other assemblage of programmable and executable code that is compiled for execution in runtime execution environment 200 to provide a corresponding service to the computing device platform. In addition, runtime execution environment 200 may translate managed code at an interpretive level into instructions that may be proxied and then executed by a processor. A framework for runtime execution environment 200 also provides class libraries, which may be regarded as software building blocks for managed applications.

Runtime execution environment 200 may provide at least partial functionality that may otherwise be expected from a kernel, which may or may not be lacking from a computing device platform depending upon resource constraints for the particular one of devices 105, 110, and 115 (see FIG. 1). Thus, at least one example of runtime execution environment 200 may implement the following: input/output (hereafter "I/O") routine management, memory management, compiling, and service routine management. Thus, runtime execution environment 200 may include I/O component 205, compiler 210, at least one memory management component 215, service routine manager 225, and execution component 225. These components, which are to be described in further detail below, are provided as examples, which are not intended to be limiting to any particular implementation of runtime execution environment 200, and no such inference should be made.

Thus, the components may be implemented in examples of runtime execution environment 200 in various combinations and configurations thereof.

I/O component 205 of runtime execution environment 200 may provide asynchronous access to data sources (i.e., processor and peripherals) associated with the computing device platform. More particularly, I/O component 205 may provide runtime execution environment 200 with robust system throughput and further streamline performance of code from which an I/O request originates.

Compiler 210 may refer to a module within runtime execution environment 200 that may interpret compiled IL into native machine instructions for execution in runtime execution environment 200. Further, in accordance with at least one example implementation of module initialization 120, compiler 210 may dynamically analyze, for various purposes, the behavior of code modules associated with an application, program, function, or other assemblage of programmable and executable code that may be loaded into runtime execution environment 200. Such analysis may include determining a version and protocol compatibility of a compiled code module. Further still, the analysis may be performed without touching or affecting an executable portion of the code modules. The analysis may be performed at compile time, initial runtime, or at any time thereafter during execution of an executable portion of the code modules.

Memory management component 215 may be regarded as a "garbage collector". Garbage collection may be regarded as a robust feature of managed code execution environments by which an object is automatically freed (i.e., de-allocated) if an object is no longer used by any applications, upon a sweep or scan of a memory heap. Further functions implemented by memory management component 215 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Service routine manager 220 may be included as at least a portion of an application support layer to provide services functionality for processors and peripherals. Example implementations of services associated with dynamic node-to-node communications pipelines may be managed by service routine manager 220, though not exclusively. For example, service routine manager 220 may enable an application to register with a service, modules including but not limited to API adapters and protocols. Further to such example implementations, service routine manager 220 may enable the configuration and assembly of node-to-node communication pipelines comprising various combinations of the adapters and protocols registered with the service, based on parameters and constraints input to the service.

Execution component 225 may enable execution of managed code for the computing device platform. More particularly, with regard to implementation of dynamic peer-to-peer communication pipelines 120, execution component 225 may serve as an exemplary component within runtime execution environment 200 that may determine one or more parameters, including, e.g., a protocol constraint, to be satisfied by a dynamic node-to-node communication pipeline. Such parameters may be input to the service into which modules and protocols are registered, as described above with regard to service routine manager 220. Further, execution component 225 may submit such parameters to a service for implementation 120.

Figure 3:
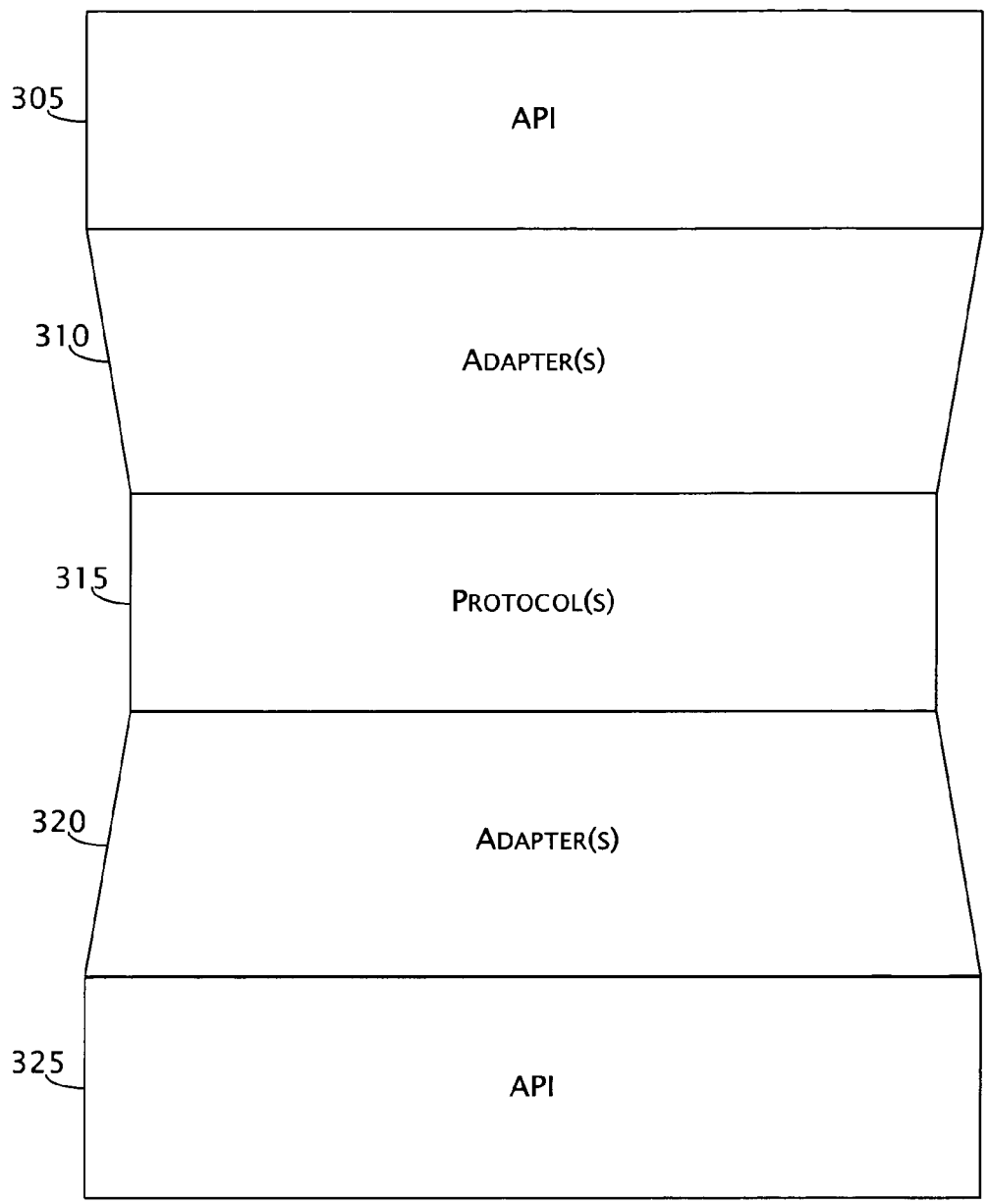
FIG. 3 shows an example implementation of a dynamic node-to-node communication pipeline.

FIG. 3 shows exemplary node-to-node communication pipeline 300, configured and assembled by at least one of the example implementations of node-to-node communication pipelines described herein.

More particularly, example implementations of node-to-node communication pipeline 300 may include a dynamically assembled succession of modules that communicatively connect two objects. Non-limiting examples of such objects, according to at least one implementation of pipeline 300, include a host application and an add-in application. Even more particularly, node-to-node communication pipelines 300 may enable inter-protocol communication from one adapter to another.

Module 305 may represent a host view object, which may be regarded as an abstract interface or class of an API for a host application.

Module 310 may represent at least one adapter that is capable of interfacing with module 305. That is, module 310 may adapt an API (i.e., module 305) of one node object for compatible communication with an API of another node object.

Module 315 may represent a protocol referring to a specification or contract through which modules, of which an API is a non-exclusive example, may communicate. Protocol 315 may be rigidly defined, and therefore invariant, so that intra-protocol modules may communicate with each other. According to at least one example implementation of pipeline 300, protocol 315 may represent any one of, at least: an inter-execution environment protocol; an inter-isolation construct protocol (i.e., within a particular execution environment, crossing from one isolation construct to another); an inter-process protocol; and an inter-machine protocol. Accordingly, protocol 315 may represent a communication bridge (e.g., isolation constructs, processes, and machines, specifications) for modules (i.e., APIs). Module 320 may represent at least one an adapter that is capable of interfacing with module 305. Module 320 may adapt an API (i.e., module 325) of one node object for compatible communication with an API (i.e., module 305) of another node object.

Module 325 may represent an add-in view object. According to the present example, module 325 may be regarded as an abstract interface or class of an API for an add-in application.

Figure 4:
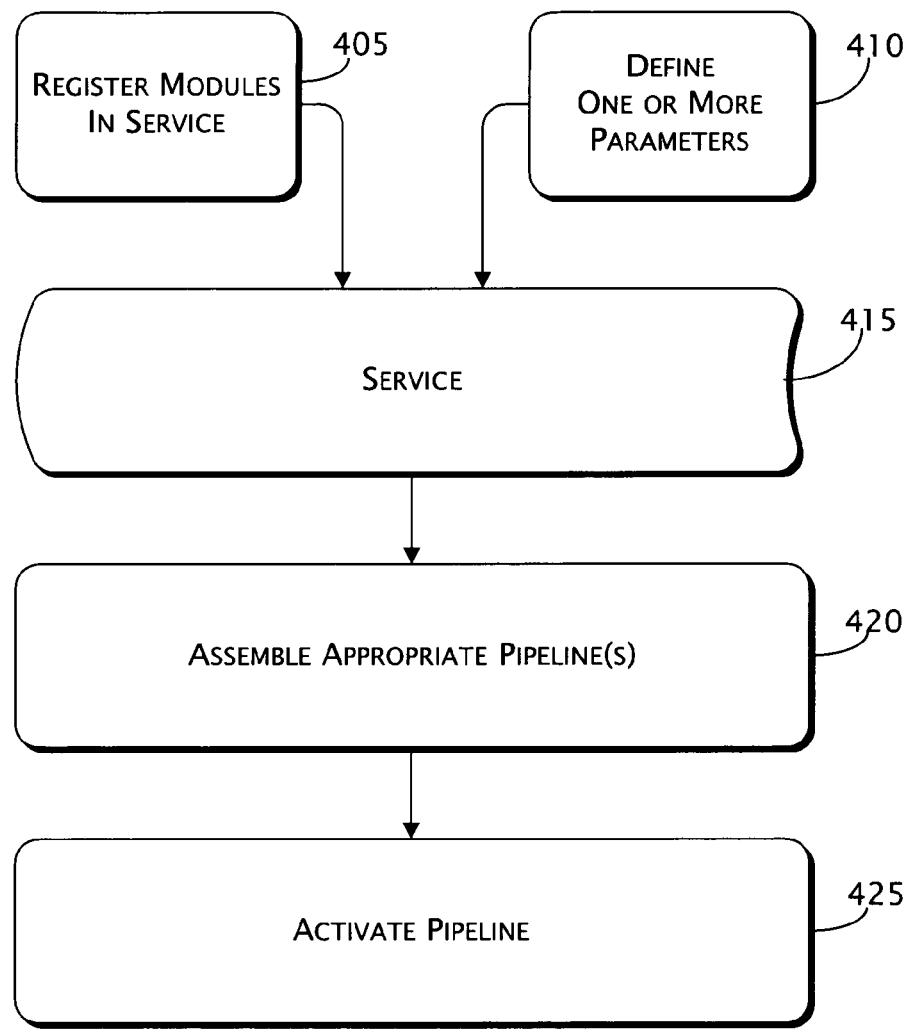
FIG. 4 shows an example processing flow in accordance with an example dynamic node-to-node communication pipeline implementation.

FIG. 4 shows example processing flow 400 in accordance with example implementation of a dynamic node-to-node communication pipeline 120 (see FIG. 1). Processing flow 400 may be described with reference to the features and characteristics described above with regard to runtime execution environment 200 in FIG. 2 and example pipeline 300 in FIG. 3.

More particularly, as a non-limiting example, the description of processing flow 400 may refer to enabling compatible communication between multiple versions of module (e.g., host view object) 305 and multiple versions of module (e.g., add-in view object) 325.

Block 405 may refer to at least one of service routine manager 220 (see FIG. 2), a host application, and an add-in application registering multiple versions of modules 310 and 320 into service 415. That is, service 415 may have registered therein multiple adapters that may be capable of interfacing with one of module 310, module 320, or at least one other adapter module for interfacing with either module 310 or module 320. As an example, service 415 may have registered therein multiple versions of host-to-protocol adapter module 310, each of which may communicatively interface between a different version of module 305 and a different protocol 315. Similarly, service 415 may also have registered therein multiple versions of protocol-to-add-in adapter module 320, each of which may communicatively interface between a different protocols 315 and different versions of module 325.

Block 405, therefore, may further refer to at least one of service routine manager 220, a host application, and an add-in application registering multiple protocols 315 into service 415. The multiple protocols 315 registered into service 415 may be specified as constraints on communication between modules, including, for example: an inter-execution environment protocol (e.g., between a managed execution environment and an unmanaged execution environment); an inter-isolation construct protocol; an inter-process protocol; and an inter-machine protocol.

Block 410 may refer to at least one of a host application and an add-in application specifying or otherwise defining parameters upon which one or more node-to-node communication pipelines are to be configured and assembled. For instance, a host application may specify at least one host view module 305, one or more constraints, and at least one add-in view module 325 upon which one or more implementations of node-to-node communication pipeline 300 are to be configured and assembled. The one or more constraints, in conjunction with host view module 305 and add-in view module 325, may be sufficient to identify an appropriate one of protocol 315. More likely though, the host application may specify a partial combination of one or more of modules 305, 315, and 325, as described above. Thus, as an example, block 410 may more particularly refer to a host application specifying or otherwise defining one or more host view modules 305 and a protocol 315 upon which one or more node-to-node communication pipelines are to be configured and assembled.

Further to the parameters specified or defined for service 415 at block 410, one or more constraints may be specified for any of host view module 305, protocol 315, and add-in view module 325 upon which one or more implementations of node-to-node communication pipeline 300 are to be configured and assembled. The constraints are parameters that may include any user-defined property to be fulfilled by a protocol between the nodes on the node-to-node communication pipeline. For instance, the constraints may specify or otherwise define permissions required to run and an isolation boundary to be supported by the specified or defined protocol 315 on a configured and assembled implementation of node-to-node communication pipeline 300. Examples of such isolation boundary may refer to local boundaries, shared isolation constructs, private isolation constructs, or other processes.

Service 415 may include any one of a database, registry, and file system disposed in an execution environment corresponding to either of the host application or add-in application. Alternatively, service 415 may be disposed in any device- or network-based location, so long as service 415 is accessible to configuring and assembling pipeline 300. As set forth above, service 415 may serve as a repository for registered modules, parameters, and constraints for configuring and assembling a multitude of implementations of node-to-node communication pipelines 300.

Block 420 may refer to any one of compiler 210, service routine manager 220, or execution module 225, either singularly or in various combinations, configuring and assembling one or more implementations of node-to-node communication pipeline 300. More particularly, pipeline 300 may be configured by chaining together combinations of one or more host-to-protocol adapters 310, protocol 315, and protocol-to-add-in adapters 320, as specified or otherwise defined by the parameters and any constraints input to service 415 at block 410.

As described so far with regard to the example of processing flow 400, a three-stage pipeline 300 may be configured and assembled at block 420. However, particularly in view of the multitude of possible versions of host view object 305 and add-in view object 325, alternative implementations of node-to-node communication pipelines 300 may contemplate one or more host-to-protocol adapters 310 or one or more protocol-to-add-in adapter 320. Thus, hundreds of permutations of three-stage or four-stage pipelines 300 may be contemplated. Although the present implementations may support five-or-more-stage pipelines 300, the number of potential permutations based on modules registered and parameters and constraints specified may increase exponentially. So, while possible, the resource consumption required by such pipelines may weigh against such implementations.

Block 425 may refer to service routine manager 220 or execution module 225, either singularly or in various combinations, activating one or more of pipelines 300 configured and assembled at block 420. More particularly, when host view object 305 determines that at least one implementation of node-to-node communication pipeline 300 satisfies the parameters and any constraints specified or otherwise defined for service 415, an isolation boundary may be created for communication processing over pipeline 300. Such isolation boundary may include a separate isolation construct (i.e., application domain) or process.

Upon activation, the modules of pipelines 300 may be loaded. That is, metadata representative of the modules that have been retrieved from service 415 may be loaded. Such load deferral may be considered to be a security measure since add-ins may be provided by a third party, and therefore a layer of trust may be missing.

By the description above, pertaining to FIGS. 1-4, module initialization for a runtime execution environment may be configured in accordance with data associated with executable code loaded therein. However, the example implementations described herein are not limited to just the environment of FIG. 1, the components of FIGS. 2 and 3, or the process of FIG. 4. Module initialization 120 (see FIG. 1) may be implemented by various combinations of the components described with reference to FIGS. 2 and 3, as well as in various orders of the blocks described with reference to FIG. 4.

Further, the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example", "alternative examples", "at least one example", "an implementation", or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that code module initialization may be implemented without one or more of the specific details, or with other methods, resources, materials, etc. In other instances, well known structures, resources, or operations have not been shown or described in detail merely to avoid obscuring aspects of the invention.

While example implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method for dynamically implementing node-to-node pipelines which allow different versions of an application and different versions of an add-in to the application to be connected using a protocol without requiring an adapter for every possible combination of versions of the application and add-in, the method comprising:

specifying at least one parameter for establishing a node-to-node pipeline implementation for connecting a version of an application with a version of an add-in using a protocol, wherein the node-to-node pipeline comprises a set of code modules including at least one of each of the following:

an application programming interfaces (API) for communicating with the application, an application API adapter through which the application API communicates with a protocol, wherein the application API adapter is specific to the version of the application and the protocol to allow the version of the application to communicate with the add-in using the protocol, the protocol for communicating data between the application and the add-in, an add-in API adapter through with an add-in API communicates with the protocol, wherein the add-in API adapter is specific to the version of the add-in and the protocol to allow the version of the add-in to communicate with the application using the protocol, and the add-in API for communicating with the add-in;

wherein multiple versions of the application API adapter and the add-in API adapter and one or more protocols are registered into a service wherein each version of the application API or add-in API adapter is configured to communicate with a corresponding version of the application API or add-in API respectively as well as one of the one or more protocols; and accessing the service to implement the node-to-node pipeline by assembling the set of code modules based on the specified at least one parameter in a predetermined order, wherein the service uses the at least one parameter to select a version of the application API adapter and a version of the add-in API adapter as well as one of the one or more protocols such that data may be communicated between the application and the add-in using the assembled pipeline.

2. A method according to claim 1, wherein the at least one parameter specifies the version of the application API.

3. A method according to claim 1, wherein the at least one parameter specifies at least one of the version of the application API, the version of the add-in API, or a protocol constraint.

4. A method according to claim 1, wherein the at least one parameter specifies a constraint including one of cross-isolation construct compatibility, cross-process compatibility, or cross-machine compatibility.

5. At least one computer-readable medium having one or more computer-executable instructions that, when read, cause one or more processors to:

register modules into a service that may be used in assembling a node-to-node communication pipeline for connecting a version of an application with a version of an add-in using a protocol, wherein the node-to-node communication pipeline comprises a set of modules including at least one of each of the following:

an application programming interface (API) for communicating with the application, an application API adapter through which the application API communicates with a protocol, wherein the application API adapter is specific to the version of the application and the protocol to allow the version of the application to communicate with the add-in using the protocol, the protocol for communicating data between the application and the add-in, an add-in API adapter through with an add-in API communicates with the protocol, wherein the add-in API adapter is specific to the version of the add-in and the protocol to allow the version of the add-in to communicate with the application using the protocol, and the add-in API for communicating with the add-in;

wherein multiple versions of the application API adapter and the add-in API adapter and one or more protocols are registered into a service wherein each version of the application API or add-in API adapter is configured to communicate with a corresponding version of the application API or add-in API respectively as well as one of the one or more protocols; and assemble at least one version of the node-to-node communication pipeline using modules that comply with the at least one parameter, wherein the at least one parameter is used to select a version of the application API adapter and a version of the add-in API adapter as well as one of the one or more protocols such that data may be communicated between the application and the add-in using the assembled pipeline.

6. At least one computer-readable medium according to claim 5, wherein the one or more instructions are executed, at least in part, at the service.

7. At least one computer-readable medium according to claim 5, wherein the node-to-node pipeline is an inter-protocol communication pipelines.

8. At least one computer-readable medium according to claim 5, wherein the node-to-node pipeline is an inter-protocol communication pipelines to be implemented from the application API to the add-in API.

9. At least one computer-readable medium according to claim 5, wherein the at least one parameter specified at least one of the version of the application API, the version of the add-in API, or an inter-protocol constraint.

10. At least one computer-readable medium according to claim 5, wherein the at least one parameter includes an inter-protocol constraint including one of cross-isolation construct compatibility, cross-process compatibility, or cross-machine compatibility.

11. At least one computer-readable medium according to claim 5, wherein the at least one parameter includes an inter-protocol constraint specifying a first node in a managed execution environment communicating with a second node in an unmanaged execution environment.

12. At least one computer-readable medium according to claim 5, wherein the one or more instructions to assemble cause the one or more processors to assemble the modules that comply with the at least one parameter in a specific order.

13. A computer system, comprising:
- an application to specify one or more parameters for a specified intra-protocol pipeline;
- a service comprising a database stored in a memory to:
  - register modules that are usable in assembling intra-protocol pipelines for connecting a version of an application with a version of an add-in using a protocol, wherein the specified intra-protocol pipeline comprises a set of modules including at least one of each of the following:
    - an application programming interface (API) for communicating with the application,
    - an application API adapter through which the application API communicates with a protocol, wherein the application API adapter is specific to the version of the application and the protocol to allow the version of the application to communicate with the add-in using the protocol,
    - the protocol for communicating data between the application and the add-in,
    - an add-in API adapter through with an add-in API communicates with the protocol, wherein the add-in API adapter is specific to the version of the add-in and the protocol to allow the version of the add-in to communicate with the application using the protocol, and
    - the add-in API for communicating with the add-in;
  - wherein multiple versions of the application API adapter and the add-in API adapter and one or more protocols are registered into a service wherein each version of the application API or add-in API adapter is configured to communicate with a corresponding version of the application API or add-in API respectively as well as one of the one or more protocols; and
  - assemble various ones of the registered modules that satisfy the one or more parameters into one or more versions of the specified intra-protocol pipeline, wherein the one or more parameters are used to select a version of the application API adapter and a version of the add-in API adapter as well as one of the one or more protocols such that data may be communicated between the application and the add-in using the assembled; and
- an activator to activate one or more of the assembled versions of the specified intra-protocol pipeline.

14. A computer system according to claim 13, wherein the one or more parameters specify at least one of the version of the application API, the version of the add-in API, or an inter-protocol constraint.

15. A computer system according to claim 13, wherein the one or more parameters include at least one of an inter-protocol constraint including one of cross-isolation construct compatibility, cross-process compatibility, or cross-machine compatibility.

16. A computer system according to claim 13, wherein the application API is for a managed execution environment and the add-in API is for an unmanaged execution environment.

* * * * *

UNITED STATES PATENT AND TRADEMARK OFFICE
CERTIFICATE OF CORRECTION

| | | |
|---|---|---|
| PATENT NO. | : 7,634,578 B2 | Page 1 of 1 |
| APPLICATION NO. | : 11/181614 | |
| DATED | : December 15, 2009 | |
| INVENTOR(S) | : Brian K. Pepin et al. | |

It is certified that error appears in the above-identified patent and that said Letters Patent is hereby corrected as shown below:

In column 10, line 61, in Claim 7, delete "pipelines." and insert -- pipeline. --, therefor.

Signed and Sealed this
First Day of February, 2011

David J. Kappos
*Director of the United States Patent and Trademark Office*